J. W. TAYLOR.
VALVE FOR PNEUMATIC TIRES.
APPLICATION FILED NOV. 7, 1914.

1,211,501.

Patented Jan. 9, 1917.

WITNESSES

INVENTOR
JAMES WALTER TAYLOR
BY Munn & Co.
ATTORNEYS

UNITED STATES PATENT OFFICE.

JAMES WALTER TAYLOR, OF LANSING, MICHIGAN, ASSIGNOR OF TWO-THIRDS TO GEORGE A. MOHR, OF LANSING, MICHIGAN.

VALVE FOR PNEUMATIC TIRES.

1,211,501. Specification of Letters Patent. Patented Jan. 9, 1917.

Application filed November 7, 1914. Serial No. 870,792.

*To all whom it may concern:*

Be it known that I, JAMES WALTER TAYLOR, a citizen of the United States, and a resident of Lansing, in the county of Ingham and State of Michigan, have invented an Improvement in Valves for Pneumatic Tires, of which the following is a specification.

My present invention relates generally to valves for pneumatic tires and is more particularly an improvement in the construction and arrangement thereof as shown in my Patent No. 1108640, dated August 25, 1914, the objects of my invention being to rearrange the parts shown in my patent in such manner as to provide a compression joint in the path of air from the outer end of the valve tube and at the same time enable certain of the parts to be more economically constructed.

Figure 1:
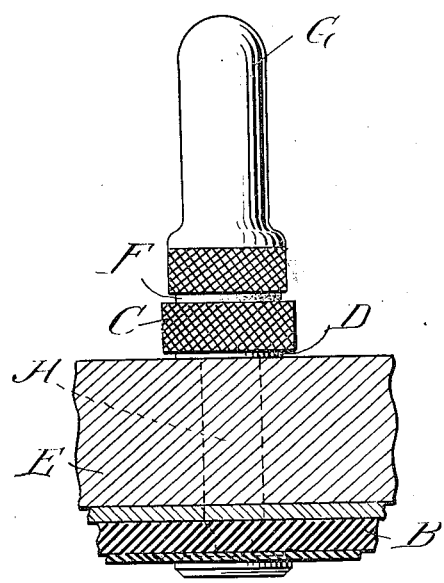
Figure 2:
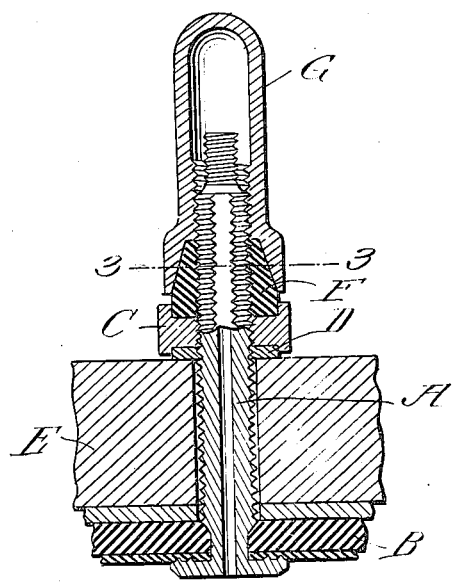
Figure 3:
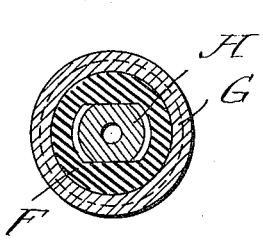

In the accompanying drawing which illustrates my present improvements, Figure 1 is a side elevation illustrating their practical application. Fig. 2 is a central vertical section taken therethrough. Fig. 3 is a detail cross section taken therethrough substantially on line 3—3 of Fig. 2, and Fig. 4 is a perspective view of the conical gasket removed.

Referring now to these figures, it will be seen that the same parts are present as in my patent above referred to, namely a valve stem A extending from the inner peripheral portion of a tire as indicated at B; a nut or bur C, an inner washer D, a tire rim E, a conical gasket F and the thimble G.

In the present construction and arrangement of the parts, however, the nut or bur C which threads on the valve stem A is similarly formed upon its opposite sides with annular grooves of substantially the same depth, the groove facing the rim E receiving the inner washer D and the other and outer groove receiving the enlarged end of the conical gasket F. It will be further seen that the thimble G in the present arrangement and construction of the parts is provided in its inner end with a conical bore which receives the smaller end of the conical gasket F whereby to form a compression joint between the outer end of the valve stem A, which is located within the thimble G, and the atmosphere. In this manner I more effectively prevent the escape of air and at the same time provide for an identical formation of the nut or bur C upon both faces. This nut or bur may therefore be more economically manufactured inasmuch as both of its grooved faces may be machined at the same time which is not possible where it is formed with a conical bore extending from one side and an annular groove in its opposite face as in my patent above referred to.

Figure 4:
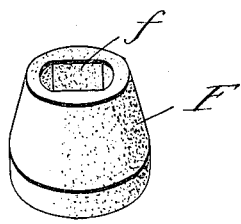

In the present case the conical gasket as seen in Fig. 4 is provided with flat internal portions which coöperate with flattened sides of the valve stem A in order to defeat turning movement of the said gasket as the thimble G is screwed tightly in position.

I claim:—

The combination of a threaded valve tube, a nut or bur threaded on the said valve tube, and having similar annularly grooved inner and outer faces, a washer extending within the groove of the inner face of the said nut or bur and adapted to bear against a wheel rim and the like, a conical gasket having its enlarged end projecting within the groove of the outer face of the said nut or bur, and a thimble threaded upon the outer end of the said valve tube and inclosing the same, and having a conical bore at its inner end receiving the smaller end of the gasket whereby to form a compression joint between the said inclosed end of the valve tube and the atmosphere, the said grooved opposite faces of the said nut or bur forming retaining rings to respectively prevent the gasket and the washer from spreading.

JAMES WALTER TAYLOR.

Witnesses:
 CHARLES F. HAIGHT,
 PHOEBE K. PEGG.